United States Patent [19]

Mahapatra et al.

[11] Patent Number: 4,786,131
[45] Date of Patent: Nov. 22, 1988

[54] STAR COUPLER

[75] Inventors: Amaresh Mahapatra, Acton; James M. Connors, Buzzards Bay, both of Mass.

[73] Assignee: Polaroid Corporation, Cambridge, Mass.

[21] Appl. No.: 78,592

[22] Filed: Jul. 28, 1987

[51] Int. Cl.⁴ .............................. G02B 6/26; G02B 6/28
[52] U.S. Cl. .................... 350/96.16; 350/96.15
[58] Field of Search ............. 350/96.12, 96.13, 96.14, 350/96.15, 96.16

[56] References Cited

U.S. PATENT DOCUMENTS

| | | | |
|---|---|---|---|
| 3,937,557 | 2/1976 | Milton | 350/96 C |
| 3,995,937 | 12/1976 | Baues et al. | 350/96 WG |
| 4,240,694 | 12/1980 | Pan | 350/96.16 |
| 4,262,995 | 4/1981 | Tangonan | 350/96.16 |
| 4,305,641 | 12/1981 | Witte | 350/96.15 |
| 4,318,586 | 3/1982 | Coyne | 350/96.16 |
| 4,360,248 | 11/1982 | Bickel et al. | 350/96.15 X |
| 4,484,794 | 11/1984 | Witte | 350/96.16 |
| 4,523,803 | 6/1985 | Arao et al. | 350/96.13 |
| 4,566,753 | 1/1986 | Mannschke | 350/96.16 |
| 4,652,081 | 3/1987 | Fatatry | 350/96.2 |
| 4,653,849 | 3/1987 | Boirat et al. | 350/96.15 X |

FOREIGN PATENT DOCUMENTS

| | | | |
|---|---|---|---|
| 0019002 | 2/1981 | Japan | 350/96.15 |
| 0070202 | 4/1983 | Japan | 350/96.13 |
| 0024804 | 2/1984 | Japan | 350/96.14 |

OTHER PUBLICATIONS

"Fiber-Optic Crossbar Switch" by J. Kennedy Space Center, NASA Tech. Briefs, vol. 4, No. 1, Spring 1979.
Integrated Optical 4×4 Star Coupler on LiNbO₃ by H. Heidrich et al., Electronics Letters, 12/6/84, vol. 20, No. 25/26, pp. 1058-1059.

Primary Examiner—William L. Sikes
Assistant Examiner—Akm E. Ullah
Attorney, Agent, or Firm—Francis J. Caufield

[57] ABSTRACT

An M×N coupler uses a planar waveguide to couple each of M input channel waveguides to each of N output channel waveguides, the input guides and the output guides being disposed on opposite sides of the planar waveguide. Uniformity of coupling is improved by joining the input channel waveguides to the planar waveguide in a manner to focus the beams emitted by each input guide into the planar waveguide at a common focal point located near the center of the edge where the output guides join the planar waveguide.

8 Claims, 2 Drawing Sheets

STAR COUPLER

FIELD OF THE INVENTION

This invention relates generally to optical coupling and particularly to an optical coupler that divides the optical energy of any one of M inputs among N outputs.

BACKGROUND OF THE INVENTION

In optical systems which involve the transmission of guided light between two locations, there is often a need for dividing light that has been transmitted along one or more channel waveguides among several channel waveguides for further transmission.

Typically, $M \times N$ prior art couplers have been complex and not easily manufactured or else have been inefficient and have provided undesirably wide variations in the degree of coupling between different ports. The present invention seeks to provide a coupler with $M \times N$ ports that is easy and relatively inexpensive to fabricate.

SUMMARY OF THE INVENTION

In an $M \times N$ coupler in accordance with the invention, an input array of channel waveguides and an output array of similar guides are joined to opposite edges of a planar wave guide and at least one of the two opposite edges is designed for focusing all of the beams exiting from the associated array of guides towards a common focal point located near the center of the other opposite edge. This is done either by orienting the channels of the exiting beams so that their axes lie along radii of the common focal point or by shaping the exit faces of such channels to refract their exiting beams to focus at the central point.

In the preferred embodiment of the invention, each of the two opposed edges of the planar wave guide is designed in the manner discussed so that the input and output arrays are disposed in a confocal arrangement.

To further increase the uniformity of the coupling, the width of the channel of an individual waveguide may be adjusted to compensate for its distance from the central point of the joining edge.

Similarly, fan-out may be used to increase the separation of individual waveguides where they are to be coupled to other waveguides.

BRIEF DESCRIPTION OF THE DRAWINGS

The invention will be better understood from the following more detailed description taken in conjunction with the accompanying drawings in which.

DETAILED DESCRIPTION

Figure 2:
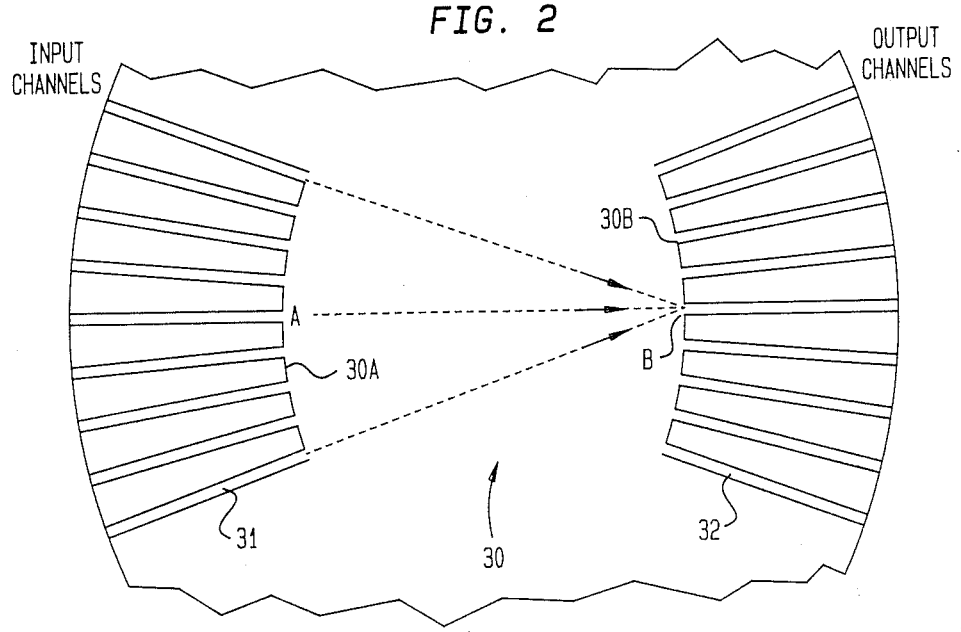
FIG. 2 shows, schematically, an $M \times N$ coupler in accordance with one embodiment of the invention.

In FIG. 2, there is shown an $M \times N$ star coupler in accordance with the present invention in which each of the M identical channel waveguides 31 is coupled to each of the N identical channel waveguides 32 by way of the intermediate planar waveguide 30. The edge 30A along which each of the channel waveguides 31 is joined to the planar waveguides corresponds essentially to the arc of a circle whose center B is near the center of the opposite edge 30B of the planar waveguide 30 and the axis of each channel waveguide 31 is essentially radially aligned with point B. Edge 30B is similarly shaped with respect to a point A at the center of edge 30A, and the axis of each of the channel waveguides 32 is essentially radially aligned with point A. The two arrays may be described as confocally disposed with respect to the planar waveguide 30. Typically, points A and B may be spaced between about 0.1 millimeters and 1.0 centimeters apart depending on the number of ports being intercoupled.

The spacing between channel waveguides advantageously is as close as possible without introducing evanescent coupling between adjacent waveguides.

In this coupler, the portions of the edge 30A which serve as the input planes of the plane waveguide 30 are all angled to be perpendicular to their associated channel waveguide so that the wave exits without bending. Moreover, it is usually desirable that each of channel waveguides 31 and 32 be single mode guides.

As such, the width of each of the guides is determined by the wavelength of the optical wave being transmitted and the index of refraction of the channel. Typically, for operation at about 0.8 microns wavelength with silver-doped channels formed in soda-lime glass substrates by ion-exchange, the width of each channel guide is about 1 to 2 microns wide, and their separation at the edges 30A and 30B may be several microns, so that arrays of 64 input and 64 output ports can readily be accommodated.

The depths of the channel waveguides and the planar waveguide are essentially the same and typically somewhat less than a micron. This depth is determined by the length of time the glass substrate is exposed to the ion-exchange treatment in the formation of the waveguides.

The channel waveguides generally are patterned by photolithographic techniques involving masks. In some instances it may prove desirable to simplify the preparation of the masks used for defining the channel by using a parallel array of channel waveguides to couple to the planar waveguide rather than radially aligned channel waveguides.

Figure 3:
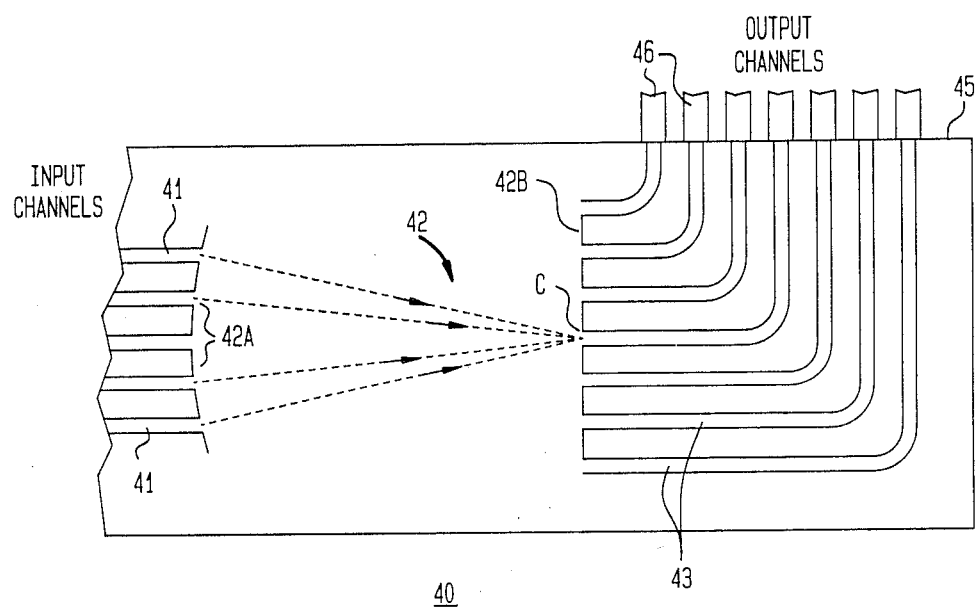
FIG. 3 shows, schematically, an $M \times N$ coupler in accordance with another embodiment of the invention.

In FIG. 3, there is shown a coupler 40 in accordance with the present invention that employs a parallel array of M channel waveguides 41 which are joined to the planar waveguide 42 along edge 42A. In this instance, the portions of the edge 42A which serve as the input planes of the various channel waveguides 41 are appropriately angled so that they largely lie along an arc of a circle whose center is at C. Accordingly, each of the beams exiting from the individual channel waveguides 41 is refracted to the focal point C at the opposite edge 42B of the planar waveguide 42. This design makes it convenient to arrange each of the channel waveguides to be parallel to one another, as shown, and to make all of the input plane portions straight. These factors simplify the preparation of the mask used to define this geometry.

In this coupler, additionally, the array of N output channels waveguides 43 are shown joined to the opposite edge 42B of the planar guide 42, that is straight, rather than curved, at some sacrifice in uniformity of coupling. Advantageously, the waveguides 43 are centered about point C. It is, of course, feasible to utilize an output array of channel waveguides in the manner of input array so that the wave energy received in each output channel wave guide is also refracted to be launched appropriately along the output channel guide with minimum coupling loss. However, the use of the arrangement shown further simplifies the preparation of the mask. Accordingly, when this becomes an important consideration, the arrangement of output couplers depicted in FIG. 3 may sometimes be preferred.

As previously indicated, it is usually desirable to pack the individual channels of both the input and output arrays of channel fibers as closely as possible where each joins the planar waveguide to improve the filling factor for maximum efficiency as well as for increased compactness. Typically, this may involve spacing of only several microns, for example, between 3 and 6 microns, between channel waveguides where they join the planar waveguide. However, this spacing is too close if each channel waveguide is to couple along a common plane separately to an optical fiber that typically will have a diameter larger than this spacing.

To solve this problem, the various output channel waveguides may be spread apart as widely as desired by the fan-out pattern shown in FIG. 3 in which each channel waveguide 43 is appropriately redirected as shown so that at the coupling plane 45 that extends normal to the output edge 42B, the various channel waveguides may be widely separated for easy coupling to the fibers 46. Of course, necessary precautions should be taken to insure that the bend is gradual enough to avoid large bending losses.

There may similarly be fanned-out the input ends of the input array of channel waveguides 41, if this is desired.

As previously indicated, the parallel arrangement depicted in FIG. 3 for the output array of channel waveguides tends to non-uniformity in coupling in the absence of special measures, if the output array of channel waveguides 43 are identical. In particular, the further an individual output channel wave 43 is from the central point C, the less energy it will typically capture since the concentration of wave energy along the edge 42B falls off with increasing distance from C. To compensate, the widths of the individual channels of waveguides 43 may be tailored so that the further a waveguide is from the central point C, the wider the width of its channel at edge 42B where it joins the planar waveguide 42, and the correspondingly larger amount of wave energy captured. If maintaining each channel waveguide to be single mode is critical, care needs to be taken to avoid making the waveguide multi-mode as the channel is widened. By decreasing the amount of dopant in the channel to reduce its index of refraction as the width of the channel is widened, the modal properties of the waveguide may be essentially maintained. This selective widening technique can similarly be used, if desired, to improve the uniformity of coupling between the output guides of the coupler shown in FIG. 2.

It should be appreciated that couplers are sometimes needed to be reciprocal in which the roles of the input and output guides are reversed so that the various factors mentioned in connection with the waveguides described as the input wave guides would be applicable to the waveguides described as the output waveguides and vice versa.

Figure 1:
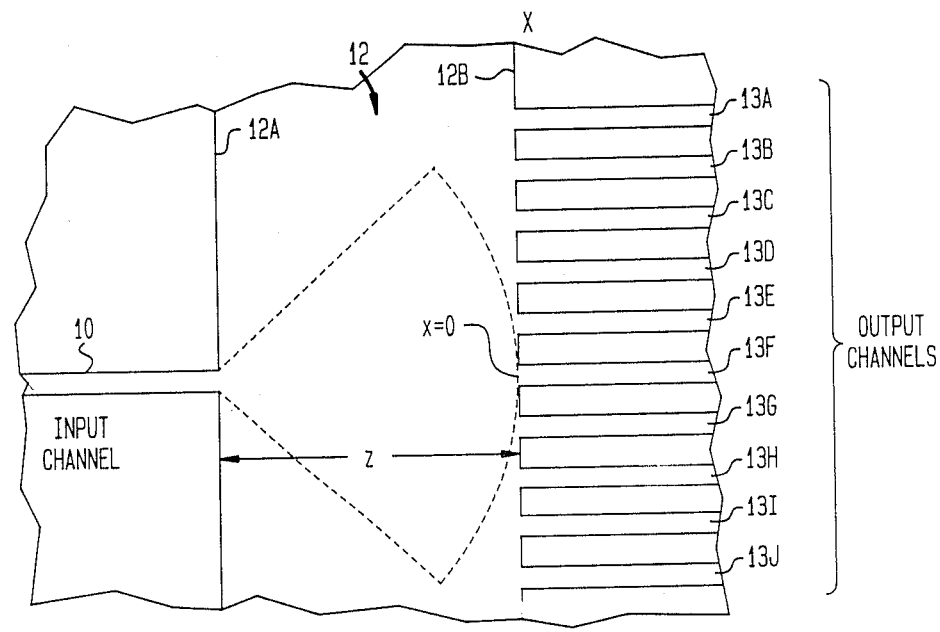
FIG. 1 shows, in schematic plan view, the basic form of coupler fundamental to the invention.

A simple form of the inventive coupler is depicted in FIG. 1 in which an input channel waveguide 10 is shown joined to one straight edge 12A of a planar waveguide 12 whose other straight edge 12B is joined to an array of identical output waveguides 13A, 13B . . . 13J which are uniformly spaced apart along the edge 12B.

It can be readily appreciated that as the wave energy in the input waveguide 10 enters the wide planar waveguide 12, it expands into a spherical beam and that the waveguide 13F, directly opposite waveguide 10, and so best positioned for coupling to it, receives more of the input wave energy than do waveguides 13A or 13J which are less advantageously positioned in respect both to distance and to orientation. As a consequence, the wave energy introduced by waveguide 10 is divided non-uniformly between the waveguides 13A . . . 13J.

This non-uniformity is more severe when, instead of a single waveguide joined to the edge 12A, there is joined an array of such waveguides, as is the case along the edge 12B, and wave energy supplied by any one of this array is intended to be divided among each of the array of waveguides joined to the edge 12B.

The fundamental version of the inventive integrated optic coupler shown in FIG. 1 in which the input and output channels are in parallel planes, although not preferred, can be used as shown, or easily extended to M×N form by adding more input channels, both versions of which can be successfully used in applications where uniformity is not a critical issue or can be compensated for by normalization techniques. However, in the M×N version of this embodiment, it is likely that M, the number of input channels, will be much less than N, the number of output channels because of the nonuniformity previously discussed.

It should be apparent that known photolithographic techniques in combination with known ion-exchange processes can readily be used to form the described structures. Various other techniques similarly are available for preparation of the couplers described.

We claim:

1. An M×N optical waveguide coupler comprising:
   a planar waveguide having a pair of opposed edges that serve as entrance and exit facets for introducing and extracting electromagnetic radiation from said waveguide, said waveguide being structured to confine radiation propagating therein in a single mode in its depth without confining it in its width so that, in its width, radiation propagates as an expanding wavefront as it travels further along said waveguide;
   at least one (M) single mode channel waveguide optically coupled to said input facet of said planar waveguide for introducing radiation into said planar waveguide to travel across said planar waveguide toward said exit facet thereof as a single mode in the depth of said planar waveguide and as an expanding wavefront in the width thereof; and
   an array of (N) single mode channel waveguides optically coupled to said exit facet of said planar waveguide at spaced apart widthwise locations therealong to receive predetermined amounts of energy from the expanding wavefront of the input radiation.

2. The waveguide coupler of claim 1 wherein said input facet is shaped in a circular arc and said array of (N) single mode channel waveguides is equally spaced along said arc so that each receives substantially equal amounts of energy from said expanding wavefront.

3. The M×N coupler of claim 2 in which each of said M channel waveguides joins said planar waveguide in a manner that radiation emitted therefrom is refracted towards said center of said exit facet of said planar waveguide.

4. The M×N coupler of claim 2 in which each of said M channel waveguides is joined to said planar waveguide in a manner to have the axis of its channel aligned with the center of said exit facet.

5. The waveguide coupler of claim 1 wherein said entrance and exit facets are both shaped in circular arcs whose center of curvatures are each located at the center of the opposite facet and both of said M and N arrays of single mode channel waveguides are each equally spaced along their respective circular arcs so that predetermined amounts of radiation introduced by each of said channel waveguides on said entrance facet reach each of said channel waveguides on said exit facet.

6. The M×N coupler of claim 1 in which said N channel waveguides join said planar waveguide along said exit facet where said exit facet is a straight edge.

7. The M×N coupler of claim 6 in which the width of each channel of the N channel waveguides increases with its distance from said center.

8. The M×N coupler of claim 7 in which at least some of the waveguides of at least one of the array of channel waveguides are fanned-out to increase the spacing between said some waveguides at a coupling plane.

* * * * *

UNITED STATES PATENT AND TRADEMARK OFFICE
CERTIFICATE OF CORRECTION

PATENT NO. : 4,786,131
DATED : November 22, 1998
INVENTOR(S) : Amaresh Mahapatra and James M. Connors It is certified that error appears in the above-identified patent and that said Letters Patent is hereby corrected as shown below:

Column 4, line 47, delete " input " and insert --- entrance ---.

Column 4, line 60, delete " input " and insert --- exit ---.

Signed and Sealed this

Twentieth Day of April, 1999

Attest:

Q. TODD DICKINSON

*Attesting Officer*    *Acting Commissioner of Patents and Trademarks*